US011273465B1

(12) United States Patent
Subrahmanyam (10) Patent No.: US 11,273,465 B1
(45) Date of Patent: Mar. 15, 2022

(54) TUNABLE ELECTROSTATIC ION AND FLUID FLOW GENERATOR AND ELECTROACOUSTIC TRANSDUCER

(71) Applicant: Desaraju Subrahmanyam, Virginia Beach, VA (US)

(72) Inventor: Desaraju Subrahmanyam, Virginia Beach, VA (US)

( * ) Notice: Subject to any disclaimer, the term of this patent is extended or adjusted under 35 U.S.C. 154(b) by 58 days.

(21) Appl. No.: 17/024,152

(22) Filed: Sep. 17, 2020

(51) Int. Cl.
*B06B 1/02* (2006.01)
*H04R 23/00* (2006.01)
*G01N 29/02* (2006.01)
*G01N 29/036* (2006.01)

(52) U.S. Cl.
CPC ......... *B06B 1/0292* (2013.01); *G01N 29/022* (2013.01); *G01N 29/036* (2013.01); *H04R 23/004* (2013.01)

(58) Field of Classification Search
CPC .. B06B 1/0292; G01N 29/022; G01N 29/036; H04R 23/004
See application file for complete search history.

(56) References Cited

U.S. PATENT DOCUMENTS

| 9,312,111 B2* | 4/2016 | Bendall | H01J 49/0413 |
| 2002/0096650 A1* | 7/2002 | Tsukihara | H01J 37/08 |
| | | | 250/492.1 |
| 2003/0150989 A1* | 8/2003 | Yoshinari | H01J 49/4255 |
| | | | 250/292 |
| 2006/0268490 A1* | 11/2006 | Joannou | B03C 3/38 |
| | | | 361/220 |
| 2012/0056085 A1* | 3/2012 | Giles | G01N 27/624 |
| | | | 250/282 |
| 2017/0138904 A1* | 5/2017 | Ueno | G01N 27/622 |
| 2020/0386713 A1* | 12/2020 | Arita | G01N 27/62 |

FOREIGN PATENT DOCUMENTS

| CA | 2685169 A1 * | 8/2008 | ......... G01N 27/624 |
| CA | 2770819 A1 * | 2/2011 | ......... G01N 27/624 |
| CA | 2788455 A1 * | 8/2011 | ......... G01N 27/624 |

* cited by examiner

*Primary Examiner* — Francis C Gray
(74) *Attorney, Agent, or Firm* — Kamran Emdadi (57) ABSTRACT

One example configuration may include one or more ionizing electrodes, one or more receiving electrodes, the one or more ionizing electrodes and the one or more receiving electrodes are exposed to a fluid to generate ions and movement in the fluid within an electric field, and the configuration also includes one or more position adjustment mechanisms to adjust an inter-electrode distance gap between the one or more ionizing electrodes and the one or more receiving electrodes.

20 Claims, 9 Drawing Sheets

TUNABLE ELECTROSTATIC ION AND FLUID FLOW GENERATOR AND ELECTROACOUSTIC TRANSDUCER

CROSS-REFERENCE TO RELATED APPLICATION

This application is related to co-pending patent application Ser. No. 17/023,905, entitled "CONTROLLABLE ELECTROSTATIC ION AND FLUID FLOW GENERATOR AND ELECTROACOUSTIC TRANSDUCER", and filed on the same date as this application, the entire contents of which are hereby incorporated by reference in their entirety.

Technical Field of the Application

This application relates to a tunable electrostatic ion and fluid flow generator that includes components that enable the optimization of the ion current, fluid movement, acoustic pressure level and cooling capacity in the electrostatic ion and fluid flow generator, and an electroacoustic transducer which includes at least one tunable electrostatic fluid flow generator optimized for acoustic pressure level and is modulated by an external modulating signal.

BACKGROUND OF THE APPLICATION

Conventional electrostatic ion and fluid flow generators, known in the art, function by producing a gas discharge, which is essentially an electrical flow (current) across a gas, turning the insulating gas into a conductor. A gas discharge is the generation of ions in a gas by applying an electric field.

An ion is an electrically charged atom or molecule where the total number of electrons is not equal to the number of protons. Therefore, the atom or molecule carries either a net positive charge or a net negative charge, and is termed either as a positive or a negative ion. An electrostatic ion and fluid flow generator may consist of a set of electrodes (i.e. one or more electrodes) exposed to the fluid, and the ionizing electric field may be produced by connecting one terminal of an external high voltage power supply to the electrode(s). The other terminal of the external high voltage power supply may be connected to the electrical earth. When the external high voltage power supply is energized, ionization may occur at the electrode(s) exposed to the fluid, and a certain number of ions may be produced. The ions may be accelerated away from the ionizing electrode(s) by their electric field, and may diffuse through the fluid; in time, they may lose their charge to the electrical earth through ambient objects in the fluid.

Alternatively, an electrostatic ion and fluid flow generator may consist of two sets of electrodes exposed to the fluid, wherein the electrode(s) of the first set are separated from the electrode(s) of the second set by an interstitial gap of fluid. An ionizing electric field may be produced between the electrode(s) of the first set and the electrode(s) of the second set by connecting the first set of electrodes to an external high voltage power supply and the second set of electrodes to the return path of the external high voltage power supply. In embodiments where the electrodes have 3D geometry, portions of the electrode(s) of the first set may overlap with portions of the electrode(s) of the second set and yet be separated from them by a gap. Ionization may occur at either set of electrodes (that is, at one or the other set, or at both) when the external high voltage power supply is energized. In operation, ion current in the fluid crosses the interstitial gap between the two sets of electrodes. The electric field between the two sets of electrodes may serve to accelerate the ions produced at either set. The return path of the external high voltage power supply may optionally be connected to the electrical earth.

Another conventional example configuration may consist of two sets of electrodes, in which the electrode(s) in the first set have a different geometry than the electrode(s) in the second set. The two sets of electrodes are exposed to the fluid, such that the electrode(s) of the first set are separated from the electrode(s) of the second set by an interstitial gap of fluid. An ionizing electric field may be produced between the electrode(s) of the first set and the electrode(s) of the second set by connecting the first set of electrodes to an external high voltage power supply and the second set of electrodes to the return path of the external high voltage power supply. Depending on the geometries of the electrodes, ionization may occur either only at the electrode(s) of the first set, or only at the electrode(s) of the second set, when the external high voltage power supply is energized. The electrode(s) at which ionization occurs may be described as 'ionizing electrode(s)'. The other electrode(s) may not originate any ions on their part, but may serve to receive the ions from the ionizing electrode(s), and may be described as 'receiving electrode(s)'. The electric field between the ionizing electrodes and receiving electrodes may serve to accelerate the ions. One or more ionizing electrodes and one or more receiving electrode, between which ions flow, may be described as a 'pair'. The return path of the external high voltage power supply may optionally be connected to the electrical earth.

Some conventional configurations may employ adjacent to the ionizing electrodes, an additional set of electrodes, which are connected to a high voltage source and produce high intensity electric fields, either DC or AC, and serve to accelerate but not receive the ions originating from the ionizing electrodes. The electrode(s) in this additional set may be described as 'accelerating electrode(s)'.

Typically, only a percentage of the molecules in the fluid may be ionized by the ionizing electrode(s), rather than all the molecules. As the produced ions are accelerated and begin to move according to the direction of the electric field, they may collide with the neutral gas molecules and transfer some of their momentum. Further, the energy of the collision may ionize the neutral gas molecule, rendering it susceptible in turn to electrostatic acceleration. A certain percentage of primary ions arising in the fluid may produce a certain percentage of secondary ionization of the nearby molecules. The total number of ions arising constitutes the 'ion current' moving between the two electrodes. A percentage of the gas molecules may acquire momentum in the direction set by the electric field, and this constitutes a fluid movement. When there is significant macroscopic (i.e. bulk) movement, a fluid flow may be said to arise. With respect to gases, this flow is often described in the art as 'ion wind'. Ion wind can produce a cooling effect depending on the velocity of the fluid molecules in the flow. Alternatively, if the ion current flowing between the electrodes is modulated, the modulating fluid movement can produce acoustic waves in the fluid.

Owing to the fact that such electrostatic ion and fluid flow generators work by accelerating ions in an electric field, they are often described in the art as electrostatic fluid accelerators (EFA).

SUMMARY OF THE APPLICATION

One example embodiment may provide an apparatus that includes one or more ionizing electrodes, one or more receiving electrodes, and the one or more ionizing electrodes and the one or more receiving electrodes are exposed to a fluid to generate ions and movement in the fluid within an electric field, and one or more position adjustment mechanisms to adjust an inter-electrode distance gap between the one or more ionizing electrodes and the one or more receiving electrodes.

Another example embodiment may include two or more pairs of one or more ionizing electrodes and one or more receiving electrodes exposed to a fluid to generate ions and movement in the fluid within an electric field, and one or more position adjustment mechanisms to adjust spaces between a first pair of the one or more ionizing electrodes and the one or more receiving electrodes and at least one additional pair of the one or more ionizing electrodes and the one or more receiving electrodes, and the two or more pairs of one or more ionizing electrodes and one or more receiving electrodes are arranged coaxially.

Another example embodiment may include a method that includes generating ions and movement in a fluid within an electric field via one or more ionizing electrodes and one or more receiving electrodes, and adjusting, via one or more position adjustment mechanisms, an inter-electrode distance gap between the one or more ionizing electrodes and the one or more receiving electrodes.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In this disclosure, certain example configurations are described as 'electrostatic ion and fluid flow generators' to indicate that such configurations may be used in applications where (i) the generated ions perform a desired function, and the fluid movement is functionally secondary or irrelevant; (ii) the generated movement flow performs a desired function, and the ions are functionally secondary or irrelevant; and (iii) both the generated ions and the fluid movement perform desired functions. Some of the applications where electrostatic ion and fluid flow generators may be used include but are not limited to: cooling of electronic devices, removing impurities from gases, propelling objects, treating surfaces, synthesizing chemicals, producing acoustic waves and dehumidifying air.

Figure 19:
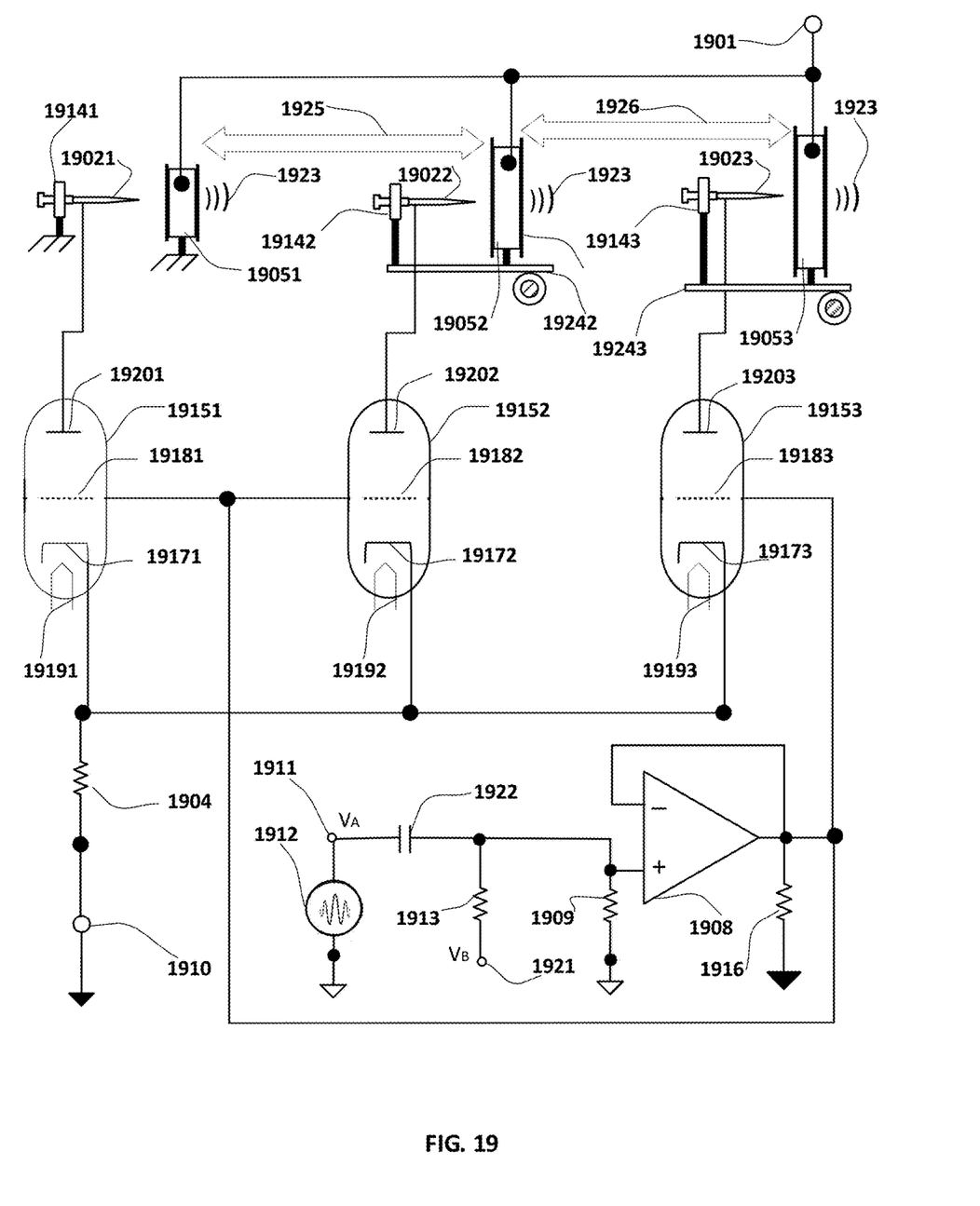
FIG. 19 illustrates a schematic diagram of the disclosed electroacoustic transducer consisting of a plurality of ionizing electrode—receiving electrode pairs arranged in cascade, according to example embodiments.
Figure 20:
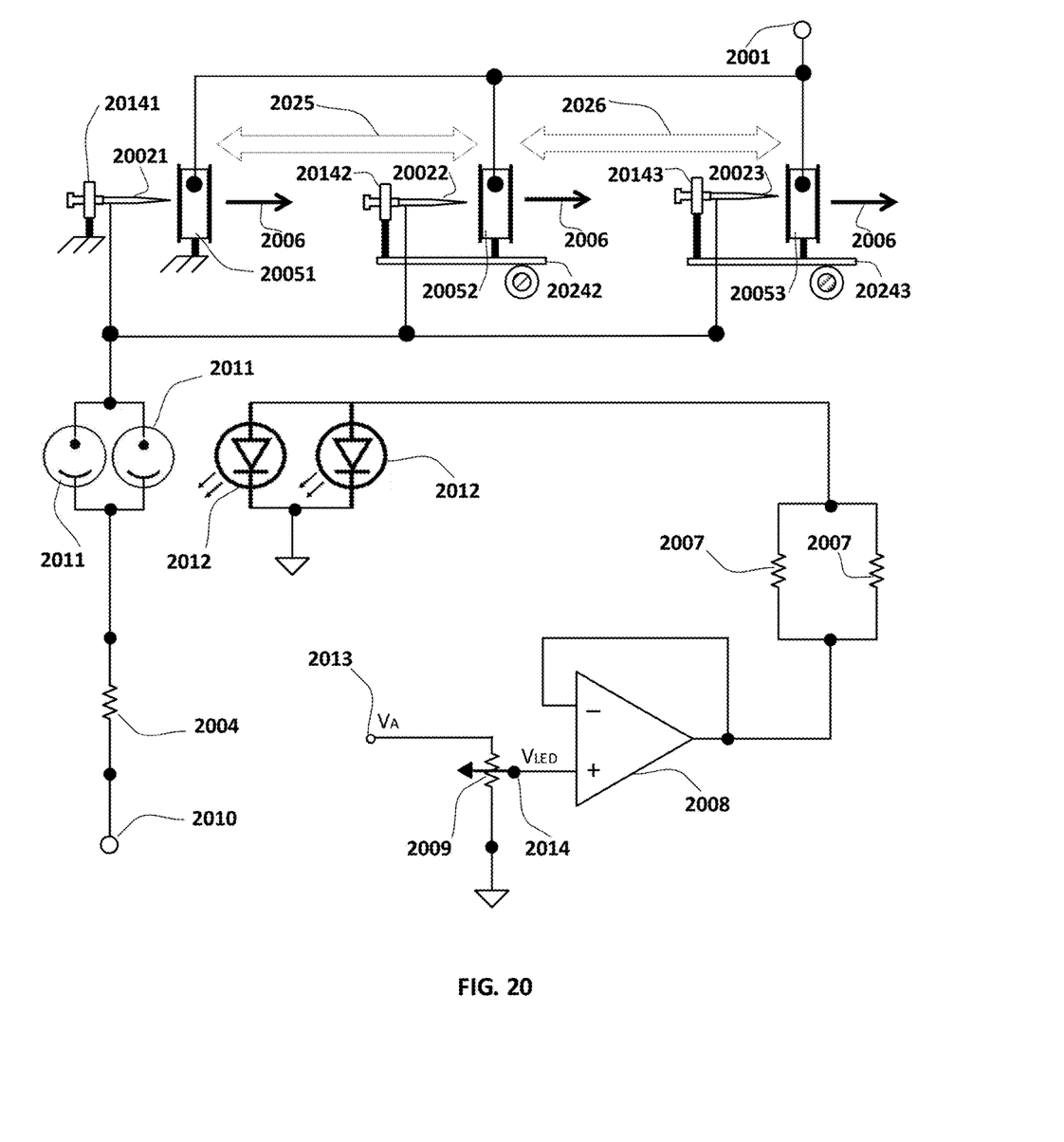
FIG. 20 illustrates a schematic diagram of the disclosed tunable ion and fluid flow generator consisting of a plurality of ionizing electrode—receiving electrode pairs arranged in cascade, and current-control for the ionizing electrodes, according to example embodiments.
Figure 21:
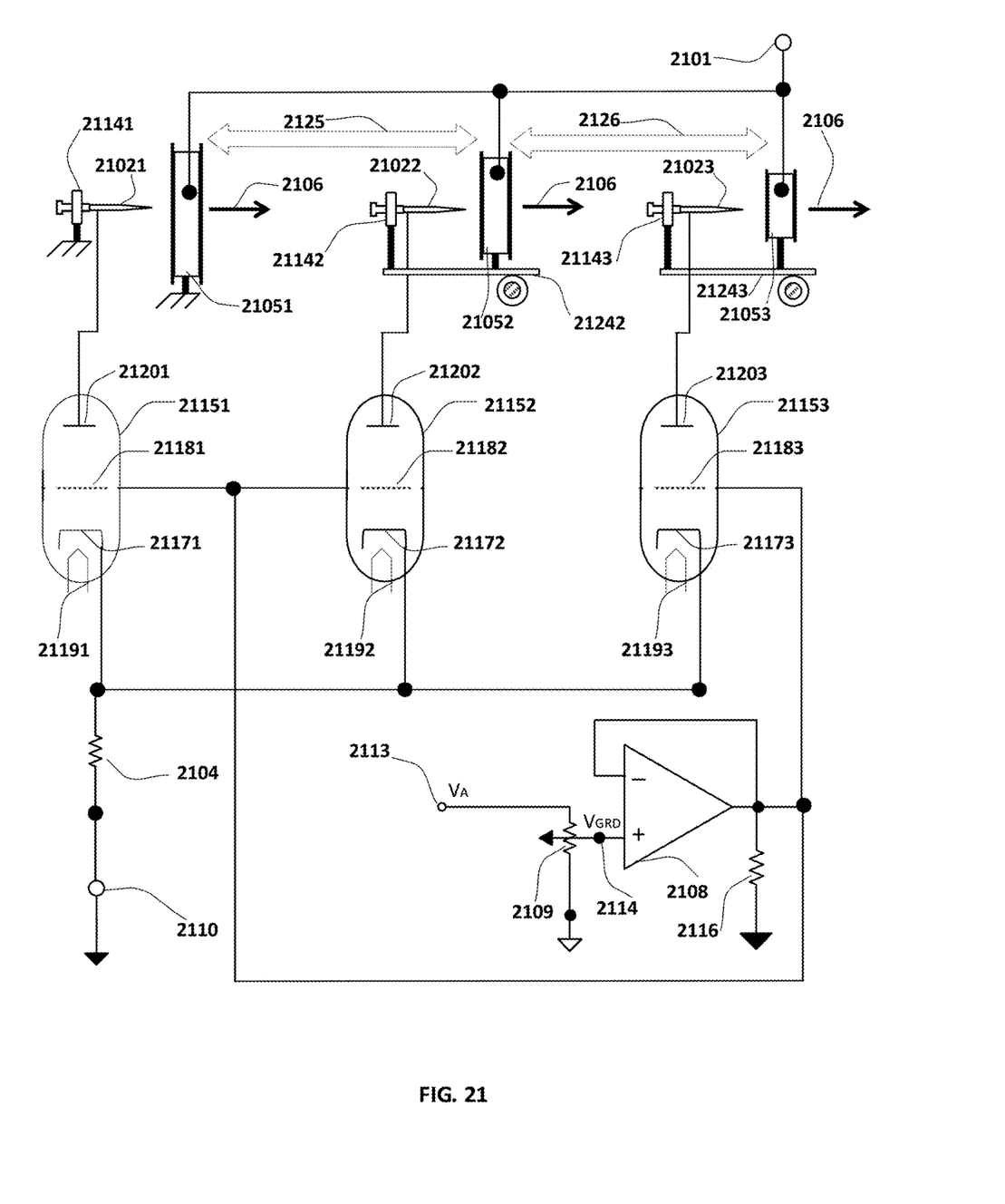
FIG. 21 illustrates another schematic diagram of the disclosed tunable ion and fluid flow generator consisting of a plurality of ionizing electrode—receiving electrode pairs arranged in cascade, and current-control for the ionizing electrodes, according to example embodiments.

It is advantageous in many situations to tune the inter-electrode distance gap in an electrostatic ion and fluid flow generator to maximize the ion current, fluid movement, acoustic pressure level or cooling capacity produced. Different electrode geometries, different electrode sizes, different inter-electrode gaps, different energizing voltage waveforms and different energizing voltage magnitudes all impact the ion current, fluid movement, acoustic pressure level and cooling capacity produced by an electrostatic ion and fluid flow generator. Further, where a plurality of ionizing electrode—receiving electrode pairs are employed in cascade, the spacing between adjacent ionizing electrode—receiving electrode pairs (i.e., distance between one pair to the next as illustrated in FIGS. 19-21) additionally impacts the fluid movement, acoustic pressure level and cooling capacity produced by an electrostatic ion and fluid flow generator. Tuning the spacing in such cases may produce result optimization. Some tuning of electrostatic ion and fluid flow generators may be achievable by careful design of the electrode geometries, electrode sizes, inter-electrode spacing, energizing voltage waveforms and energizing voltage magnitudes, but relying on design alone and employing high precision components to closely match the design, may render the resulting device expensive, inflexible and sub-optimal due to inevitable variation of actual parameters from design.]] A dynamic and tunable electrostatic ion and fluid flow generator may be more versatile, and more suitable for research/laboratory purposes.

It may be cumbersome and expensive to provide flexibility of the electrode geometries and/or electrode sizes in the physical device so as to make an electrostatic ion and fluid flow generator tunable. Similarly, it may be expensive and sub-optimal to provide flexibility of the physical waveform and/or magnitude of the high voltage applied to the electrodes, so as to make an electrostatic ion and fluid flow generator tunable. Further, the voltage margin between the onset of electrical discharge in the fluid and electrical breakdown of the fluid (i.e., sparking) is quite narrow. Thus, there is a limited range of high voltage adjustment over which such devices can operate safely and with an optimal outcome. It may be simple, inexpensive and optimal to provide flexibility of the inter-electrode gap, and provide flexibility of the inter-pair spacing where a plurality of ionizing electrode—receiving electrode pairs are employed, in cascade, in the physical device so as to make an electrostatic ion and fluid flow generator tunable.

According to some example embodiments, the present application provides configurations which enable the position adjustment of electrodes in the device, so as to change the inter-electrode distance gap within a pair of ionizing and receiving electrodes and thereby maximize the ion current, fluid movement, acoustic pressure level or cooling capacity produced by the device. According to some other example embodiments, where a plurality of ionizing electrode—receiving electrode pairs are employed in cascade, the present application provides configurations which additionally enable the position adjustment of entire electrode pairs in the device, so as to change the inter-pair spacing, and thereby maximize the fluid movement, acoustic pressure level and/or cooling capacity produced by the device.

According to some other example embodiments, the present application provides configurations which function as electroacoustic transducers and which enable adjustment of the inter-electrode distance gap within a pair of ionizing and receiving electrodes for a maximum acoustic pressure level, and the tunable electrostatic ion and fluid flow generator is operated by applying an external modulating signal to current-controlled electrodes in the device. According to some other example embodiments, where a plurality of ionizing electrode—receiving electrode pairs are employed in cascade, the present application provides configurations which function as electroacoustic transducers and which additionally enable the adjustment of the inter-pair spacing for maximum acoustic pressure level, and the tunable electrostatic ion and fluid flow generator is operated by applying an external modulating signal to current-controlled electrodes in the device.

Embodiments of the present application may include one or more electrostatic ion and fluid flow generators, and mechanisms which enable position adjustment for the electrodes, such as, for example: bolt-and-nut sets, rack-and-pinion sets, ball-and-screw sets, rollers, actuators (hereafter called 'position-adjusting mechanisms'), and devices for driving the position-adjusting mechanisms, such as, for example: electric motors, pneumatic motors, manual knobs (hereafter called 'driving devices'). The driving devices are not shown in the drawings for simplicity and clarity.

The tunable electrostatic ion and fluid flow generators may be connected to external high voltage power supplies for generating ions and movement in the fluid, and may include at least one pair of ionizing electrodes and receiving electrodes. Either of the ionizing and receiving electrodes may be attached to a position-adjusting mechanism or mechanisms, and the position-adjusting mechanism or mechanisms may be attached to a driving device or devices. Further, where a plurality of ionizing electrode—receiving electrode pairs are employed in cascade, an ionizing electrode—receiving electrode pair may be attached to an additional position-adjusting mechanism or mechanisms, and the position-adjusting mechanism or mechanisms may be attached to a driving device or devices.

The tunable ion and fluid flow generator disclosed in this specification has the capability of being simple and efficient, and it can be constructed with very few elements, using technologically mature devices that are commercially available and relatively inexpensive, and that are easy to maneuver. For example, nylon hex bolts and nuts driven by hand or an automated driving device may be used as position-adjusting mechanisms to change the inter-electrode distance gap within a pair of ionizing and receiving electrodes of the generator. Therefore, the generator is reliable, flexible and easy to maintain, and the adjustment range is optimal.

The electroacoustic transducer according to example embodiments may have higher acoustic output and improved low frequency (bass) performance compared to other electrostatic fluid flow designs. It does not require the input signal to be boosted to the high voltage level (e.g., kilovolt range) and thus avoids the use of high voltage transformers in the signal path. It also provides a resistive load to external amplifiers supplying the input signal, and requires moderate power of the external amplifiers. Depending on the type of application, it may demand either certain levels of current or certain levels of voltage swing, but generally not both.

Since example configurations do not require modulation of the high voltage applied to the electrodes to generate vibrations in the fluid, the disclosed device has a higher power output than designs that modulate the high voltage applied to the electrodes to generate vibrations in the fluid. For example, certain conventional configurations may operate by superposing a modulating electric field on the ionizing or accelerating electric field applied to the electrodes, which has the drawback of limited acoustic output.

The relationship between the electric field applied to the electrodes and the ion current generated may not be linear. Therefore, certain conventional designs that modulate the high voltage applied to the electrodes to generate vibrations in the fluid may exhibit non-linearity in the output. As the disclosed device configurations do not require modulation of the high voltage applied to the electrodes to generate vibrations in the fluid, it has a more linear output than such designs.

Compared to a Corona Wind Loudspeaker, the disclosed configuration provides: (i) higher acoustic output, and (ii) does not require high rating tubes (special purpose tubes) nor high voltage transformers, to obtain the high-level control voltage (i.e., kilovolt range) required to control the ion current. The disclosed embodiments may perform satisfactorily with popular general-purpose triodes such as a 12AX7 or ECC83 triode.

In one example embodiment, the disclosed electroacoustic transducer may include a plurality of tunable ion and fluid flow generators that may be operated using digital modulation techniques such as pulse code modulation (PCM), to jointly produce vibrations in the fluid that correspond to a modulating signal, such as an audio frequency signal. Such a PCM-driven electroacoustic transducer has the advantage of eliminating the need for Digital-to-Analog converters (DACs) and analog amplifiers in the signal path, and this may reduce distortions, player device complexity and cost.

Other optimal characteristics of the disclosed electroacoustic device configurations which are distinguishable over the commercially pre-dominant loudspeakers that generate sound by mechanically vibrating a diaphragm, may be understood by recapitulating the disadvantages of such loudspeakers requiring diaphragms. For example, diaphragms of certain mechanical mass have inertia attributes that inhibits them from responding quickly to changes in a driving audio signal, resulting in diminished transient response. Such loudspeakers also exhibit resonance phenomena that vitiate their frequency response, and produce vibrations in the structure of their bodies as well as the enclosures and supporting objects, which have their own modes and distort the sound.

Being dependent on a restoring mechanism to push the diaphragm back towards a center position on the decreasing intervals of the driving audio signal, the conventional loudspeakers exhibit non-linearity of the produced sound. The geometry of the diaphragm is changed to some extent large or small when it is subjected to acceleration, which distorts the sound. The material of the diaphragm also limits the quality of sound produced, which further diminishes the fidelity of the sound. In the case of loudspeakers that drive the diaphragms by Lorentz forces generated by passing current through electrical coils situated in a magnetic field, the material of the coil is also known to modify the sound.

Other concerns with conventional loudspeakers may include the possibility of permanent damage when over-driven by the applied audio signal. The loudspeakers also carry the possibility of deterioration in quality or permanent failure over time due to wear and tear of their respective materials. The loudspeakers that use Lorentz force to drive the diaphragm exhibit a non-linear frequency response, because the electrical coils used to generate the Lorentz force are essentially inductors. This configuration diminishes the fidelity of the sound. The conventional loudspeakers also produce considerable waste heat that compromises their efficiency. They generally demand high power from the external driving amplifier by requiring both high current and high voltage swing together, while presenting a frequency-varying load to the amplifier, which makes those conventional loudspeakers challenging to drive and affects the sound quality.

In contrast to the conventional loudspeaker configurations, the disclosed electroacoustic device being 'diaphragm-less' and 'coil-less', is free of the above disadvantages and hence may produce better quality sound that is more attuned to the driving audio signal, while being more efficient and presenting a moderate power load to the external driving amplifier, which is also a resistive load and hence invariant with frequency.

The following description guides those skilled in the art to construct an example embodiment of the invention, and is not intended to limit the scope, applicability, or configuration of the invention. Various modifications may be made in the geometry, function and arrangement of constituent elements without departing from the spirit and scope of the invention. In particular, it should be understood that the geometries of the electrodes as represented in the drawings, their mutual arrangement, and their position adjustment mechanisms, as well as their description below, are for illustration purposes only. They are to be regarded as examples, and are not intended to limit the geometries of the electrodes that may be used to construct the device, their mutual arrangement, nor their position adjustment mechanisms.

It should be understood that the external high voltage power sources (HVPS) referred to in the example embodiments may be either DC or AC sources. The terminals of the external high voltage power source may be connected to the power terminals of the example embodiments. Optionally, the return path of the external high voltage power source may also be connected to the electrical earth (i.e., ground), such as may be available at the dedicated grounding prong of a 3-prong power plug when plugged into AC mains. If an external high voltage power source having dual polarity is used, the common terminal of the dual polarity voltage source may be connected to the electrical earth. In this application, voltage having a value of 1 kV or more, is regarded as 'high voltage', and voltage having a value of less than 1 kV is regarded as 'low voltage'.

Figure 1:
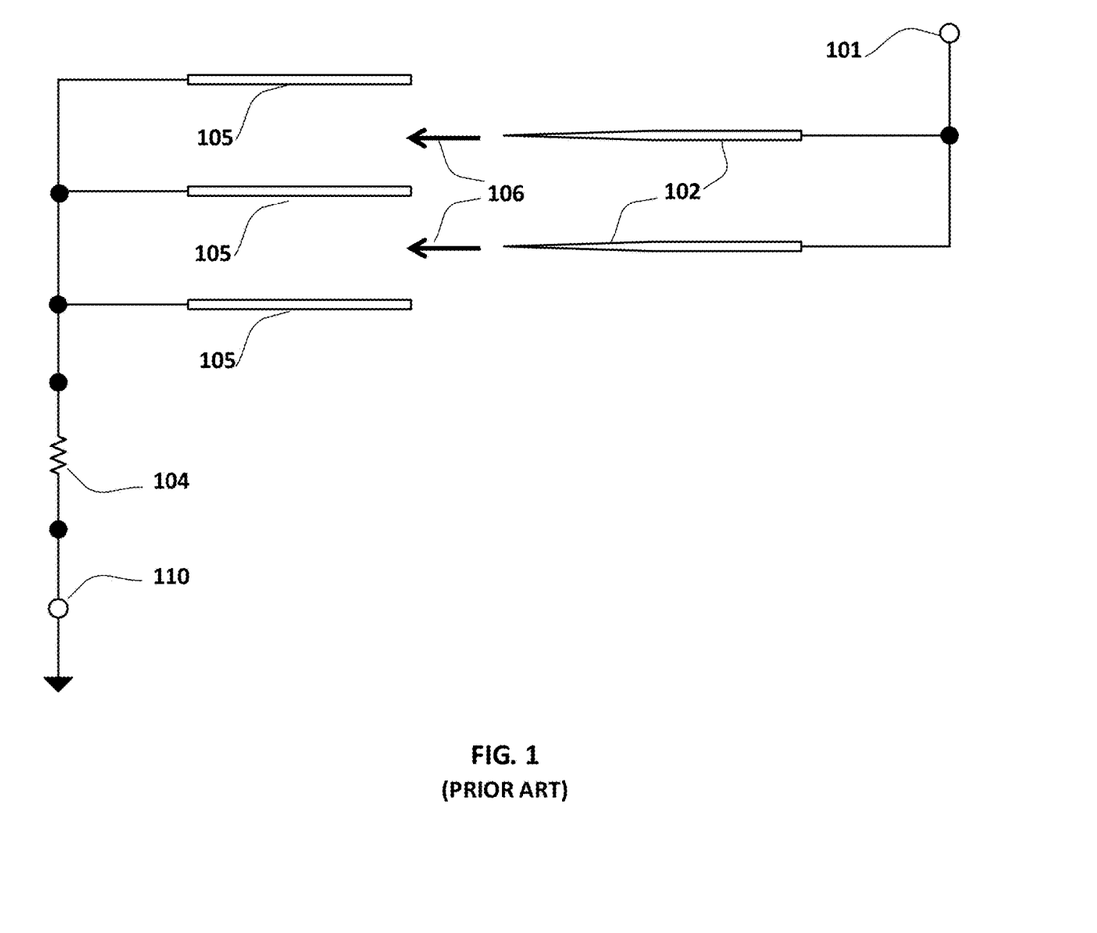
FIG. 1 illustrates a schematic diagram of a conventional ion and fluid flow generator consisting of one set of ionizing electrodes and one set of receiving electrodes.

A conventional electrostatic ion and fluid flow generator is represented in FIG. 1. One or more ionizing electrodes 102 are connected to power terminal 101. One or more receiving electrodes 105 are connected to power terminal 110 either directly or through optional resistor 104 having value in the ohm or kilo-ohm range. An external HVPS (not shown) is connected at power terminal 101 and the return path of the external HVPS is connected to power terminal 110. An electric field is established between the one or more ionizing electrodes 102 and one or more receiving electrodes 105. Ions generated at ionizing electrodes 102 move towards receiving electrodes 105, originating secondary ions. Fluid movement 106 is established in the interstitial gap between the electrodes by collision of the ions with neutral molecules. Ions arriving at receiving electrodes 105 give up their charge which flows as current to power terminal 110, either directly or through optional resistor 104.

The electrodes used in the electrostatic ion and fluid flow generator may have the geometries illustrated in FIGS. 2 through 7. In particular, the receiving electrodes may have the geometries illustrated in FIG. 2 through FIG. 6, and the ionizing electrodes may have the geometry illustrated in FIG. 7.

Figure 2:
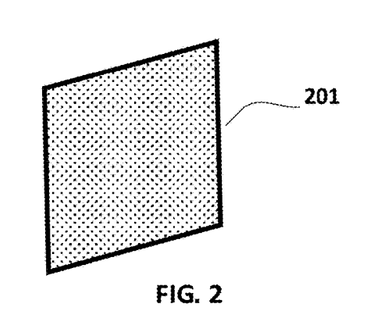
FIG. 2 illustrates a perspective view of an example geometry for a receiving electrode having a perforated flat rectangular plate.
Figure 3:
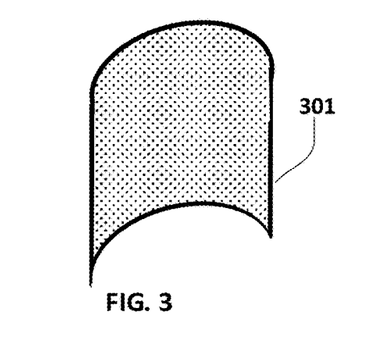
FIG. 3 illustrates a perspective view of an example geometry for a receiving electrode having a perforated hemi-cylindrical channel.
Figure 4:
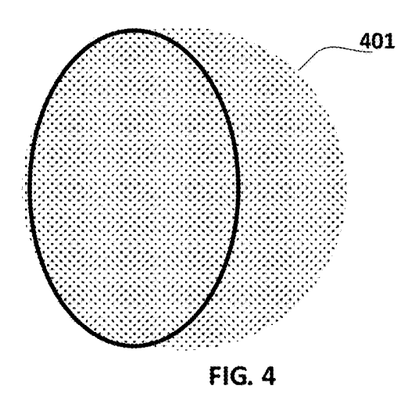
FIG. 4 illustrates a perspective view of an example geometry for a receiving electrode having a perforated hemi-spherical cup.
Figure 5:
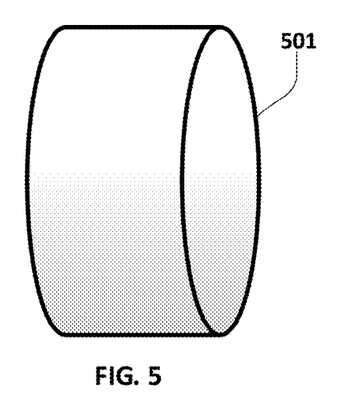
FIG. 5 illustrates a perspective view of an example geometry for a receiving electrode having a cylindrical pipe.
Figure 6:
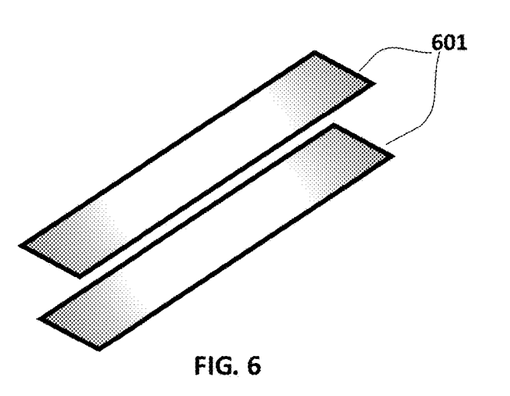
FIG. 6 illustrates a perspective view of an example geometry for a receiving electrode having a parallel plate set.
Figure 7:
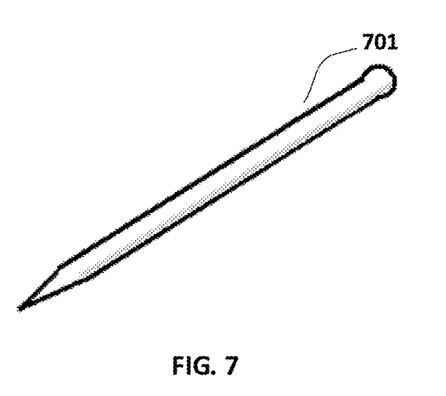
FIG. 7 illustrates a perspective view of an example geometry for an ionizing electrode having a needle shape.

In FIG. 2, receiving electrode 201 has perforated flat rectangular plate geometry, according to example embodiments. In FIG. 3, receiving electrode 301 has perforated hemi-cylindrical channel geometry, according to example embodiments. In FIG. 4, receiving electrode 401 has perforated hemi-spherical cup geometry, according to example embodiments. In FIG. 5, receiving electrode 501 has cylindrical pipe geometry, according to example embodiments. In FIG. 6, receiving electrode 601 has parallel plate set geometry, according to example embodiments. In FIG. 7, ionizing electrode 701 has needle geometry, according to example embodiments.

Figure 11:
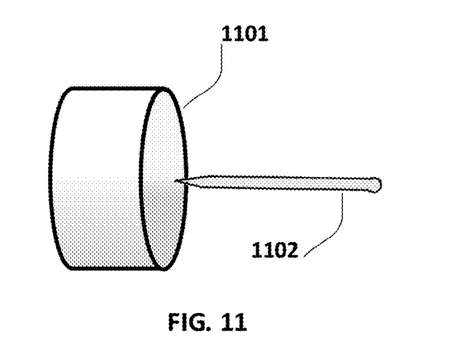
FIG. 11 illustrates a perspective view of a mutual arrangement of a receiving electrode having a cylindrical pipe geometry and an ionizing electrode having a needle geometry.
Figure 12:
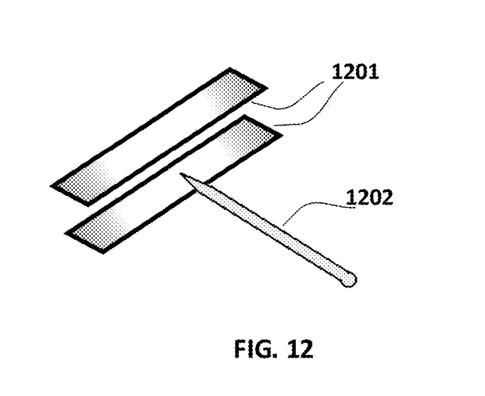
FIG. 12 illustrates a perspective view of a mutual arrangement of a receiving electrode having a parallel plate set and an ionizing electrode having a needle geometry.
Figure 13:
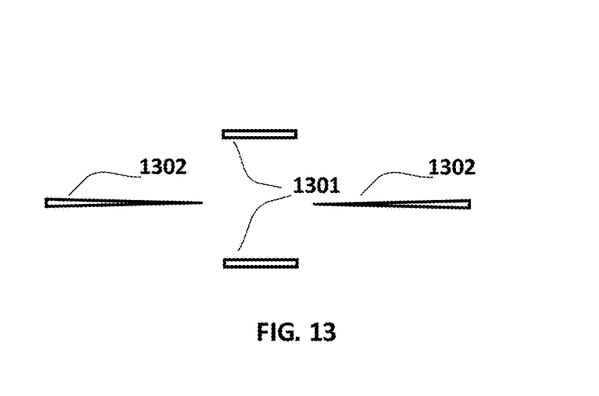
FIG. 13 illustrates an elevation view of a mutual arrangement of a receiving electrode having a parallel plate set geometry and ionizing electrodes having a needle geometry.

The ionizing and receiving electrodes used in the electrostatic fluid flow generator may have the mutual arrangements illustrated in any of FIG. 8 through FIG. 12, which are perspective views, and in FIG. 13, which is an elevation or sideways view.

Figure 8:
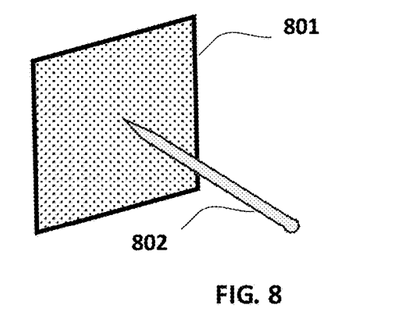
FIG. 8 illustrates a perspective view of a mutual arrangement of a receiving electrode having a perforated flat rectangular plate geometry and an ionizing electrode having a needle geometry.

In FIG. 8, the receiving electrode 801 has perforated flat rectangular plate geometry, and one or more ionizing electrodes 802 having needle geometry may be situated with their axes perpendicular to the plane of the rectangle 801, and pointing towards the surface but separated from it by a gap.

Figure 9:
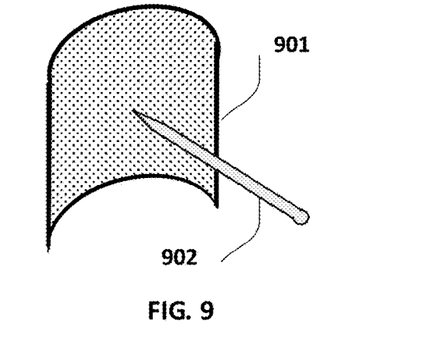
FIG. 9 illustrates a perspective view of a mutual arrangement of a receiving electrode having a perforated hemi-cylindrical channel geometry and an ionizing electrode having a needle geometry.

In FIG. 9, the receiving electrode 901 has perforated hemi-cylindrical channel geometry, and one or more ionizing electrodes 902 having needle geometry, which may be situated with their axes perpendicular to the axis of the hemi-cylinder 901 and pointing towards the concave surface, but separated from it by a gap.

Figure 10:
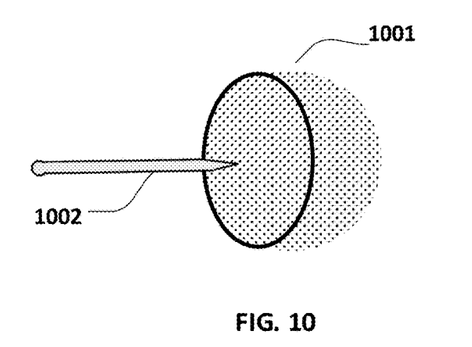
FIG. 10 illustrates a perspective view of a mutual arrangement of a receiving electrode having a perforated hemi-spherical cup geometry and an ionizing electrode having a needle geometry.

In FIG. 10, the receiving electrode 1001 has a perforated hemi-spherical cup geometry, and one ionizing electrode 1002 having needle geometry may be situated with its axis perpendicular to the mouth of the hemi-spherical cup 1001 and pointing towards the concave surface, but separated from it by a gap.

In FIG. 11, the receiving electrode 1101 has cylindrical pipe geometry, and one ionizing electrode 1102 having needle geometry may be situated with its axis parallel to the axis of the cylinder and pointing towards the pipe 1101. Optionally, an additional ionizing electrode (not shown explicitly) having needle geometry may be situated on the other side of the pipe in mirror symmetry.

In FIG. 12, the receiving electrode 1201 has parallel plate set geometry, and one or more ionizing electrodes 1202 having needle geometry may be situated with their axes parallel to the planes of the parallel plates 1201 and pointing towards the gap between the plates. In FIG. 13, the receiving electrode 1301 has parallel plate set geometry, and one set each of ionizing electrodes 1302 having needle geometry are situated on either side of the parallel plate set 1301, with the needles of either set pointing in the direction of the needles of the other set. The arrangement of electrodes shown in FIG. 13 may increase the acoustic power when the present invention is used to generate acoustic vibrations in a fluid.

Figure 14:
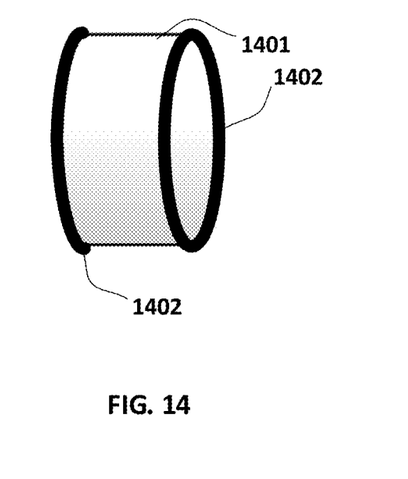
FIG. 14 illustrates a perspective view of a receiving electrode having an optional layer of insulation on all its edges according to example embodiments.

In FIG. 14, receiving electrode 1401 having cylindrical pipe geometry is shown with optional insulation layer 1402 on all the edges, according to example embodiments. It should be understood that the optional insulation layer may be present on all the edges of a receiving electrode regardless of geometry. It should also be understood that the disclosed device may be operated either with or without the optional edge-insulation.

In this disclosure, the cylindrical pipe geometry with optional edge-insulation is shown for the receiving electrodes, and the needle geometry is shown for the ionizing electrodes, in the drawings of the disclosed device example configurations of FIG. 17, FIG. 18, FIG. 19, FIG. 20 and FIG. 21. All the electrodes are shown in elevation for example purposes. For instance, in FIG. 17, ionizing electrodes 1702 which have needle geometry are shown in the form or shape of thin elongated needles, while receiving electrodes 1705 have cylindrical pipe geometry with optional edge-insulation, are shown in the shape of rectangles bounded by solid black lines on two sides.

It should be understood that the above geometries are chosen only for simplifying the illustration. The disclosed device examples require for its functioning a set of ionizing electrodes that can produce electrical discharge in the fluid, and optionally a set of receiving electrodes. Therefore, ionizing electrodes and receiving electrodes having such geometries that electrical discharge may be produced in the fluid are within the scope and spirit of the invention. It should be understood therefore that the geometries of the receiving electrodes shown in FIGS. 2-6, and the geometry of the ionizing electrodes shown in FIG. 7, are intended to serve as examples only, for guiding those skilled in the art to construct the disclosed device embodiments, and are not intended to convey limitations. Similarly, it should be understood therefore that the mutual arrangements of the receiving electrodes and ionizing electrodes shown in FIGS. 8-13, are intended to serve as examples only, for guiding those skilled in the art to construct the disclosed device, and are not intended to convey limitations.

For reasons of simplicity and clarity, no accelerating electrodes are shown explicitly in the drawings of the disclosed device in FIG. 17, FIG. 18, FIG. 19, FIG. 20 and FIG. 21, however, an example embodiment of the disclosed device may include one or more accelerating electrodes.

In all the drawings representing electronic devices powered by low voltage supplies (i.e., voltage under 1 kV), the return path of the low voltage circuit is represented by one triangle shaped line-end having black outline and white interior pointing towards the bottom of the view. The return path of the high voltage circuit (i.e., voltage great than or equal to 1 kV), is represented by one triangle shaped line-end having solid black color pointing towards the bottom of the view. The return path of the low voltage circuit may or may not be connected to the return path of the high voltage circuit.

Figure 15:
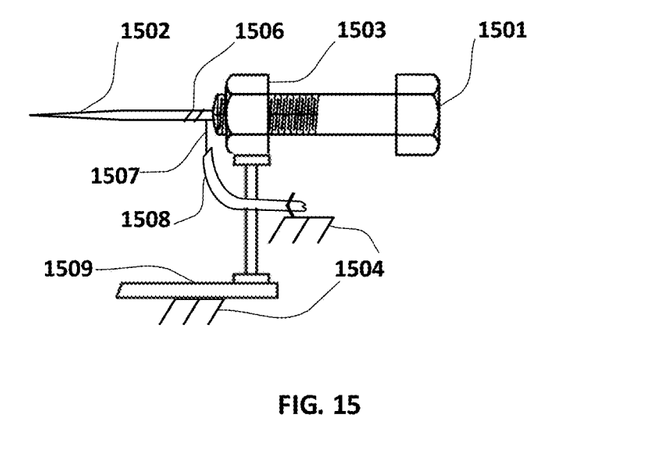
FIG. 15 illustrates an elevation view of an ionizing electrode mounted on a position-adjusting mechanism according to example embodiments.

An example position-adjusting mechanism consisting of a set of hex-bolt and nut is represented in FIG. 15. Referring to FIG. 15, hex-bolt 1501 is screwed into nut 1503 to an extent, and nut 1503 is attached to the chassis 1504 of the device through supporting member 1509. Electrode 1502 having needle geometry is attached to the bottom face of hex-bolt 1501. Cable 1508 connects electrode 1502 to the HV circuit and is clamped to the chassis 1504 and a section of naked conductor 1507 is wound around the electrode 1502 for electrical contact forming coil 1506. By turning hex-bolt 1501, the position of electrode 1502 with respect to the chassis may be adjusted. Hex-bolt 1501 and nut 1503 together constitute a mechanism for adjusting the position of electrode 1502 in the device.

Figure 16:
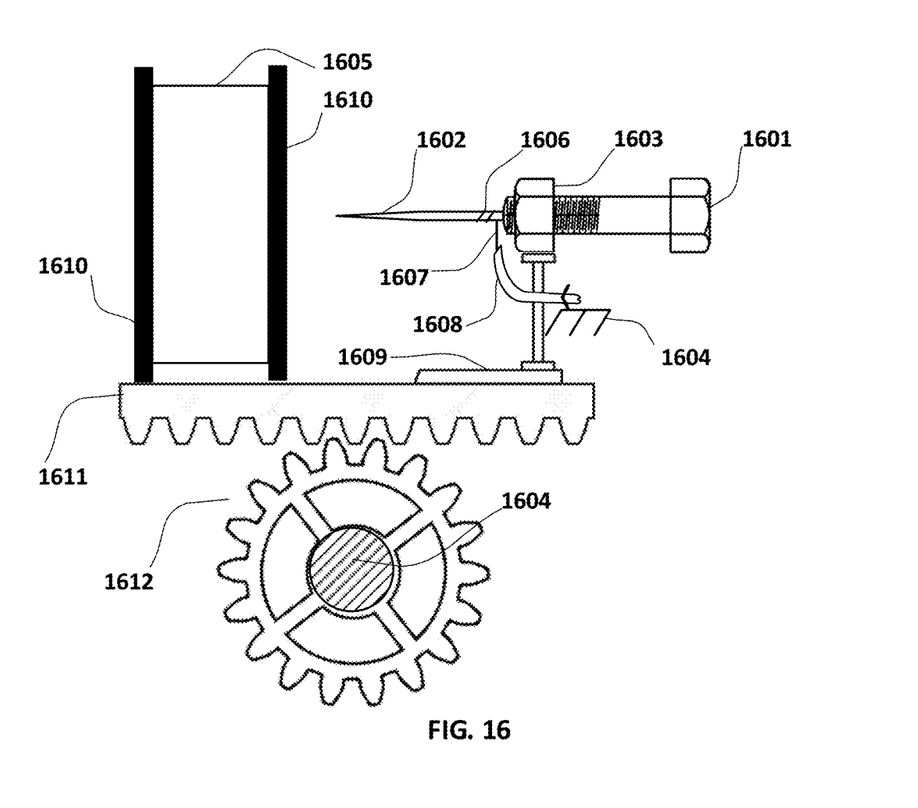
FIG. 16 illustrates an elevation view of a receiving electrode with optional edge-insulation and a position-adjustable ionizing electrode together mounted on an additional position-adjusting mechanism according to example embodiments.

An example additional position-adjusting mechanism consisting of a set of rack and pinion is represented in FIG.

16. Referring to FIG. 16, hex-bolt 1601 is screwed into nut 1603 to an extent, and nut 1603 is attached to the rack 1611 through supporting member 1609. Electrode 1602 having needle geometry is attached to the bottom face of hex-bolt 1601. Cable 1608 connects electrode 1602 to the HV circuit and is clamped to the chassis 1604 and a section of naked conductor 1607 is wound around the electrode 1602 for electrical contact forming coil 1606. By turning hex-bolt 1601, the position of electrode 1602 with respect to electrode 1605 may be adjusted. Electrode 1605 having cylindrical pipe geometry, and which may also have insulation layers 1610, is attached to rack 1611. Rack 1611 is engaged with pinion 1612 and pinion 1612 is attached to the chassis 1604 of the device. Rack 1611 and pinion 1612 together constitute an additional mechanism for adjusting the position in the device of electrode pair formed by electrodes 1602 and 1605.

Figure 17:
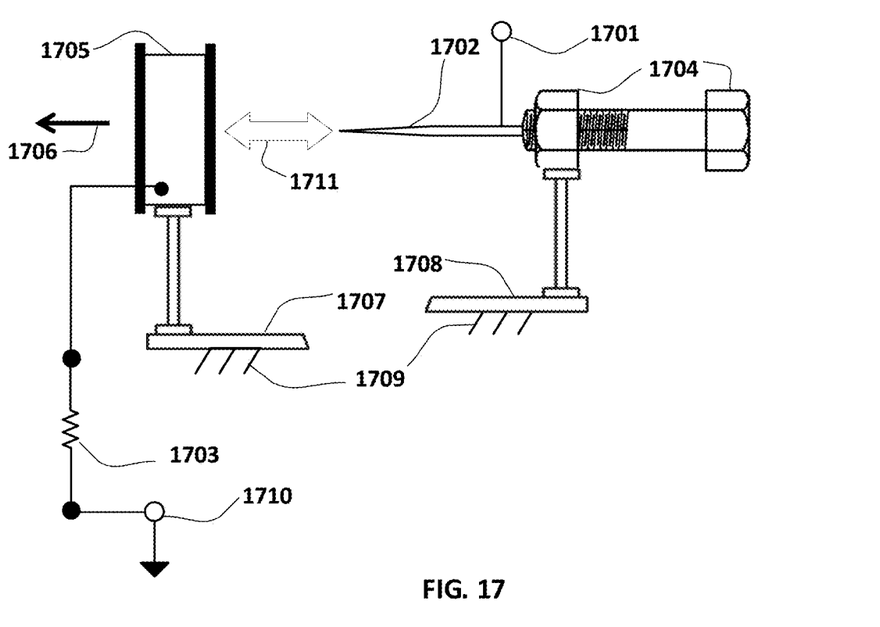
FIG. 17 illustrates schematic diagram of the disclosed tunable ion and fluid flow generator according to example embodiments.

An example embodiment of the disclosed tunable electrostatic ion and fluid flow generator is represented in FIG. 17. One or more ionizing electrodes 1702, which have a needle geometry, are mounted respectively on one or more position-adjustment mechanisms 1704 which are attached to the chassis 1709 through respective supporting members 1708. One or more receiving electrodes 1705, which have cylindrical pipe geometry, are positioned facing the respective ionizing electrodes 1702 and are attached to the chassis 1709 through respective supporting members 1707. The ionizing electrodes 1702 may be connected to power terminal 1701. The receiving electrodes 1705 may be connected to power terminal 1710 either directly or through optional resistor 1703 having a value in the ohm or kilo-ohm range. An external HVPS (not shown) is connected at power terminal 1701 and the return path of the external HVPS is connected to power terminal 1710. An electric field is established between the receiving electrodes 1705 and respective ionizing electrodes 1702 and ion current flows between them. Fluid flow is established in the direction 1706. By adjusting the position-adjustment mechanism 1704 to tune the inter-electrode distance gap 1711, the ion current, the fluid flow and/or the cooling capacity of the device may be optimized for the desired application.

Figure 18:
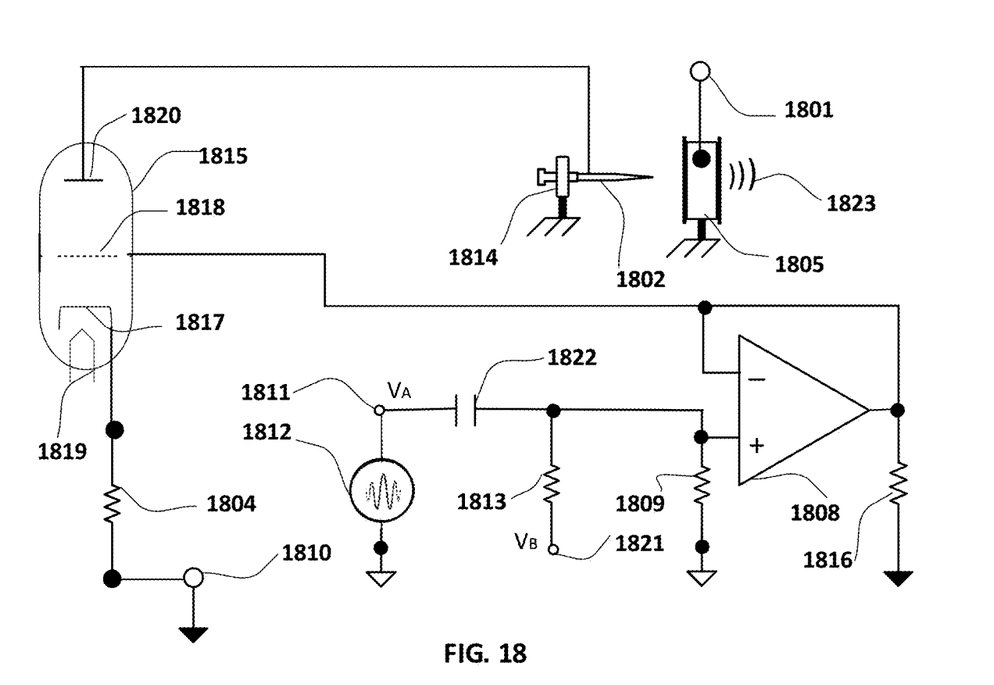
FIG. 18 illustrates a schematic diagram of the disclosed electroacoustic transducer according to example embodiments.

An example embodiment of the disclosed electroacoustic transducer is represented in FIG. 18. One or more ionizing electrodes 1802, which have needle geometry, are mounted respectively on one or more position-adjustment mechanisms 1814 which are attached to the chassis. One or more receiving electrodes 1805, which have cylindrical pipe geometry, and which are positioned facing the respective ionizing electrodes 1802 are attached to the chassis and connected to power terminal 1801. The one or more ionizing electrodes 1802 are connected to anodes 1820 of one or more triode vacuum tubes 1815. Heaters 1819 of triode vacuum tubes 1815 may be energized by a power supply (not shown). Cathodes 1817 of triode vacuum tubes 1815 are connected to power terminal 1810 either directly or through optional resistor 1804 having value in the ohm or kilo-ohm range. An external HVPS (not shown) is connected at power terminal 1801 and the return path of the external HVPS is connected to power terminal 1810. An electric field is established between the one or more ionizing electrodes 1802 and one or more receiving electrodes 1805.

Voltage buffer 1808 provides a control voltage of low voltage to the grids 1818 of triode vacuum tubes 1815. Resistor 1816 connects the grids 1818 of triode vacuum tubes 1815 to the return path of the high voltage circuit. A bias voltage VB may be applied at terminal 1821 from a low voltage source (not shown). A modulating signal $V_A$ may be applied at terminal 1811 from external source 1812. Resistor 1813 forms a voltage divider with resistor 1809. The capacitor 1822 may serve to isolate the external signal source 1812 connected to terminal 1811 from the voltage present on resistor 1809.

According to the magnitude of the modulating voltage on the grids 1818, some non-zero modulating current flows between the anode(s) 1820 and the cathode(s) 1817 of triode vacuum tubes 1815. As a result, modulating ionization may be originated at ionizing electrodes 1802. Ions generated at ionizing electrodes 1802 move towards receiving electrodes 1805 in a modulating pattern, colliding with fluid molecules and originating secondary ions. Acoustic waves 1823 arise at one or more receiving electrodes 1805. Ions arriving at receiving electrodes 1805 give up their charge which flows as current to the HVPS (not shown) that is connected at power terminal 1801. In FIG. 18, the operational amplifier 1808 is energized by low voltage power supplies, which are not shown.

By adjusting the position-adjustment mechanism 1814, the acoustic pressure level of acoustic waves 1823 may be optimally maximized by modifying the interstitial gap between the electrodes 1802 and 1805 to a level that provides the optimum acoustic pressure level in the fluid therebetween.

It should be understood that the triode vacuum tubes 1815 and voltage buffer 1808 serve to control the current through the ionizing electrodes 1802, hence they are 'current-controlling' elements, and capacitor 1822 and resistors 1813 and 1809 serve to interface an external modulating signal to the disclosed tunable electrostatic fluid flow generator, which may then function as an electroacoustic transducer, hence they are 'interfacing' elements.

An example embodiment of the disclosed electroacoustic transducer consisting of a plurality of ionizing electrode—receiving electrode pairs arranged in cascade is represented in FIG. 19. One or more ionizing electrodes 19021, which have needle geometry, are mounted respectively on one or more position-adjustment mechanisms 19141 which are attached to the chassis. One or more receiving electrodes 19051, which have cylindrical pipe geometry, are positioned facing the respective ionizing electrodes 19021 and attached to the chassis and connected to power terminal 1901. One or more ionizing electrodes 19021 are connected to anodes 19201 of one or more triode vacuum tubes 19151. Heaters 19191 of triode vacuum tubes 19151 may be energized by a power supply (not shown). Cathodes 19171 of triode vacuum tubes 19151 is connected to power terminal 1910 either directly or through optional resistor 1904 having value in the ohm or kilo-ohm range.

Further, one or more ionizing electrodes 19022, which have needle geometry, are mounted respectively on one or more position-adjustment mechanisms 19142 which are mounted respectively on the one or more additional position-adjustment mechanisms 19242. One or more receiving electrodes 19052, which have cylindrical pipe geometry, are positioned facing the respective ionizing electrodes 19022 and connected to power terminal 1901, and the receiving electrodes 19052 are mounted on additional position-adjustment mechanisms 19242, which are attached to the chassis. The one or more ionizing electrodes 19022 are connected to anodes 19202 of one or more triode vacuum tubes 19152. Heaters 19192 of triode vacuum tubes 19152 may be energized by a power supply (not shown). Cathodes 19172 of triode vacuum tubes 19152 are connected to power terminal 1910 either directly or through optional resistor 1904 having value in the ohm or kilo-ohm range.

Further, one or more ionizing electrodes 19023, which have needle geometry, are mounted respectively on one or more position-adjustment mechanisms 19143 which are mounted respectively on one or more additional position-adjustment mechanisms 19243. One or more receiving electrodes 19053, which have cylindrical pipe geometry, are positioned facing the respective ionizing electrodes 19023 and connected to power terminal 1901, and the receiving electrodes 19053 are mounted respectively on one or more additional position-adjustment mechanisms 19243, which are attached to the chassis. The one or more ionizing electrodes 19023 are connected to anodes 19203 of one or more triode vacuum tubes 19153. Heaters 19193 of triode vacuum tubes 19153 may be energized by a power supply (not shown). Cathodes 19173 of triode vacuum tubes 19153 are connected to power terminal 1910 either directly or through optional resistor 1904 having value in the ohm or kilo-ohm range.

Further, receiving electrodes 19051, 19052 and 19053 may be in increasing order of size.

Further, an external HVPS (not shown) is connected at power terminal 1901 and the return path of the external HVPS is connected to power terminal 1910. An electric field is established between the one or more ionizing electrodes 19021 and one or more receiving electrodes 19051, and between the one or more ionizing electrodes 19022 and one or more receiving electrodes 19052, and between the one or more ionizing electrodes 19023 and one or more receiving electrodes 19053.

Further, voltage buffer 1908 provides a control voltage to the grids 19181, 19182 and 19183 of triode vacuum tubes 19151, 19152 and 19153. Resistor 1916 connects the grids 19181, 19182 and 19183 of triode vacuum tubes 19151, 19152 and 19153 to the return path of the high voltage circuit. A bias voltage VB may be applied at terminal 1921 from a low voltage source (not shown). A modulating signal $V_A$ may be applied at terminal 1911 from external source 1912. Resistor 1913 forms a voltage divider with resistor 1909. The capacitor 1922 may serve to isolate the external signal source 1912 connected to terminal 1911 from the voltage present on resistor 1909.

According to the magnitude of the modulating voltage on the grids 19181, 19182 and 19183, some non-zero modulating current flows between the anodes 19201, 19202 and 19203 and the respective cathodes 19171, 19172 and 19173 of triode vacuum tubes 19151, 19152 and 19153 respectively. As a result, modulating ionization may be originated at ionizing electrodes 19021, 19022 and 19023. Ions generated at ionizing electrodes 19021, 19022 and 19023 move towards respective receiving electrodes 19051, 19052 and 19053 in a modulating pattern, colliding with fluid molecules and originating secondary ions. Acoustic waves 1923 arise at one or more receiving electrodes 19051, 19052 and 19053. Ions arriving at receiving electrodes 19051, 19052 and 19053 give up their charge which flows as current to the HVPS (not shown) that is connected at power terminal 1901. In FIG. 19, the operational amplifier 1908 is energized by low voltage power supplies, which are not shown.

By adjusting the position-adjustment mechanisms 19141, 19142 and 19143 to tune the inter-electrode gaps in the device, and by adjusting the additional position-adjustment mechanisms 19242 and 19243 to tune the inter-pair spacings 1925 and 1926 in the device, the acoustic pressure level of acoustic waves 1923 may be maximized.

It should be understood that the triodes 19151, 19152 and 19153 and voltage buffer 1908 serve to control the current through the ionizing electrodes 19021, 19022 and 19023, hence they are 'current-controlling' elements, and capacitor 1922 and resistors 1913 and 1909 serve to interface an external modulating signal to the disclosed tunable electrostatic fluid flow generator, which may then function as an electroacoustic transducer, hence they are 'interfacing' elements.

An example embodiment of the disclosed tunable ion and fluid flow generator consisting of a plurality of ionizing electrode—receiving electrode pairs arranged in cascade is represented in FIG. 20. One or more ionizing electrodes 20021, which have needle geometry, are mounted respectively on one or more position-adjustment mechanisms 20141 which are attached to the chassis. One or more receiving electrodes 20051, which have cylindrical pipe geometry, are positioned facing the respective ionizing electrodes 20021 and attached to the chassis and connected to power terminal 2001.

Further, one or more ionizing electrodes 20022, which have needle geometry, are mounted respectively on one or more position-adjustment mechanisms 20142 which are mounted respectively on the one or more additional position-adjustment mechanisms 20242. One or more receiving electrodes 20052, which have cylindrical pipe geometry, are positioned facing the respective ionizing electrodes 20022 and connected to power terminal 2001, and the receiving electrodes 20052 are mounted on additional position-adjustment mechanisms 20242, which are attached to the chassis.

Further, one or more ionizing electrodes 20023, which have needle geometry, are mounted respectively on one or more position-adjustment mechanisms 20143 which are mounted respectively on the one or more additional position-adjustment mechanisms 20243. One or more receiving electrodes 20053, which have cylindrical pipe geometry, are positioned facing the respective ionizing electrodes 20023 and connected to power terminal 2001, and the receiving electrodes 20053 are mounted respectively on or more additional position-adjustment mechanisms 20243, which are attached to the chassis. Further, receiving electrodes 20051, 20052 and 20053 may be of same size.

Further, an external HVPS (not shown) is connected at power terminals 2001 and 2010. An electric field is established between the one or more ionizing electrodes 20021 and one or more receiving electrodes 20051, and between the one or more ionizing electrodes 20022 and one or more receiving electrodes 20052, and between the one or more ionizing electrodes 20023 and one or more receiving electrodes 20053.

The ionizing electrodes 20021, 20022 and 20023 may be connected to the anodes of one or more phototubes 2011, and the cathodes of phototubes 2011 may be connected to power terminal 2010 either directly or through resistor 2004 having value in the ohm or kilo-ohm range.

The phototubes 2011 may be placed in close proximity to light-emitting diodes 2012, within a light-tight enclosure (not shown) and may receive photons emitted from the diodes 2012. A DC low voltage $V_A$ from an external power source (not shown) may be applied at terminal 2013 and potentiometer 2009 may provide adjustable voltage $V_{LED}$ 2014 to the input of amplifier 2008. Amplifier 2008 may supply current to the light-emitting diodes 2012 through one or more resistors 2007. From the light-emitting diodes 2012, the current may flow to the return path of the circuit of amplifier 2008.

The luminosity of light-emitting diodes 2012 may produce some non-zero current flowing through phototubes 2011. As a result, ionization may be originated at ionizing electrodes 20021, 20022 and 20023. Ions generated at ionizing electrodes 20021, 20022 and 20023 move towards respective receiving electrodes 20051, 20052 and 20053, colliding with fluid molecules and originating secondary ions. Fluid flow 2006 arises in the device. Ions arriving at receiving electrodes 20051, 20052 and 20053 give up their charge which flows as current to the HVPS (not shown) that is connected at power terminal 2001. In FIG. 20, the operational amplifier 2008 is energized by low voltage power supplies, which are not shown.

By adjusting the position-adjustment mechanisms 20141, 20142 and 20143 to tune the inter-electrode gaps in the device, and by adjusting the additional position-adjustment mechanisms 20242 and 20243 to tune the inter-pair spacings 2025 and 2026 in the device, the ion current, fluid flow or cooling capacity may be maximized. By adjusting the potentiometer 2009, the ion current, fluid flow or cooling capacity desired at any time can be set.

It should be understood that the phototubes 2011, the light-emitting diodes 2012 and amplifier 2008 serve to control the current through the ionizing electrodes 20021, 20022 and 20023, hence they are 'current-controlling' elements, and potentiometer 2009 serves to interface an external low voltage source to the disclosed tunable electrostatic fluid flow generator, hence it is an 'interfacing' element.

Another example embodiment of the disclosed tunable ion and fluid flow generator consisting of a plurality of ionizing electrode—receiving electrode pairs arranged in cascade is represented in FIG. 21. One or more ionizing electrodes 21021, which have needle geometry, are mounted respectively on one or more position-adjustment mechanisms 21141 which are attached to the chassis. One or more receiving electrodes 21051, which have cylindrical pipe geometry, are positioned facing the respective ionizing electrodes 21021 and attached to the chassis and connected to power terminal 2101. The one or more ionizing electrodes 21021 are connected to anodes 21201 of one or more triode vacuum tubes 21151. Heaters 21191 of triode vacuum tubes 21151 may be energized by a power supply (not shown). Cathodes 21171 of triode vacuum tubes 21151 are connected to power terminal 2110 either directly or through optional resistor 2104 having value in the ohm or kilo-ohm range.

Further, one or more ionizing electrodes 21022, which have needle geometry, are mounted respectively on one or more position-adjustment mechanisms 21142 which are mounted respectively on the one or more additional position-adjustment mechanisms 21242. One or more receiving electrodes 21052, which have cylindrical pipe geometry, are positioned facing the respective ionizing electrodes 21022 and connected to power terminal 2101, and the receiving electrodes 21052 are mounted on additional position-adjustment mechanisms 21242, which are attached to the chassis. The one or more ionizing electrodes 21022 are connected to anodes 21202 of one or more triode vacuum tubes 21152. Heaters 21192 of triode vacuum tubes 21152 may be energized by a power supply (not shown). Cathodes 21172 of triode vacuum tubes 21152 are connected to power terminal 2110 either directly or through optional resistor 2104 having value in the ohm or kilo-ohm range.

Further, one or more ionizing electrodes 21023, which have needle geometry, are mounted respectively on one or more position-adjustment mechanisms 21143 which are mounted respectively on one or more additional position-adjustment mechanisms 21243. One or more receiving electrodes 21053, which have cylindrical pipe geometry, are positioned facing the respective ionizing electrodes 21023 and connected to power terminal 2101, and the receiving electrodes 21053 are mounted respectively on one or more additional position-adjustment mechanisms 21243, which are attached to the chassis. The one or more ionizing electrodes 21023 are connected to anodes 21203 of one or more triode vacuum tubes 21153. Heaters 21193 of triode vacuum tubes 21153 may be energized by a power supply (not shown). Cathodes 21173 of triode vacuum tubes 21153 are connected to power terminal 2110 either directly or through optional resistor 2104 having value in the ohm or kilo-ohm range. Further, receiving electrodes 21051, 21052 and 21053 may be in decreasing order of size.

Further, an external HVPS (not shown) is connected at power terminal 2101 and the return path of the external HVPS is connected to power terminal 2110. An electric field is established between the one or more ionizing electrodes 21021 and one or more receiving electrodes 21051, and between the one or more ionizing electrodes 21022 and one or more receiving electrodes 21052, and between the one or more ionizing electrodes 21023 and one or more receiving electrodes 21053.

Further, voltage buffer 2108 provides a control voltage to the grids 21181, 21182 and 21183 of triode vacuum tubes 21151, 21152 and 21153. Resistor 2116 connects the grids 21181, 21182 and 21183 of triode vacuum tubes 21151, 21152 and 21153 to the return path of the high voltage circuit. A DC low voltage $V_A$ from an external power source (not shown) may be applied at terminal 2113 and potentiometer 2109 may provide adjustable voltage $V_{GRD}$ at the input 2114 of voltage buffer 2108.

According to the magnitude of the control voltage on the grids 21181, 21182 and 21183, some non-zero current flows between the anodes 21201, 21202 and 21203 and the respective cathodes 21171, 21172 and 21173 of triode vacuum tubes 21151, 21152 and 21153 respectively. As a result, ionization may be originated at ionizing electrodes 21021, 21022 and 21023. Ions generated at ionizing electrodes 21021, 21022 and 21023 move towards respective receiving electrodes 21051, 21052 and 21053, colliding with fluid molecules and originating secondary ions. Fluid flow 2106 arises in the device. Ions arriving at receiving electrodes 21051, 21052 and 21053 give up their charge which flows as current to the HVPS (not shown) that is connected at power terminal 2101. In FIG. 21, the operational amplifier 2108 is energized by low voltage power supplies, which are not shown.

By adjusting the position-adjustment mechanisms 21141, 21142 and 21143 to tune the inter-electrode gaps in the device, and by adjusting the additional position-adjustment mechanisms 21242 and 21243 to tune the inter-pair distance spacings 2125 and 2126 in the device, the cooling capacity of the device may be maximized.

It should be understood that the triodes 21151, 21152 and 21153 and voltage buffer 2108 serve to control the current through the ionizing electrodes 21021, 21022 and 21023, hence they are 'current-controlling' elements, and potentiometer 2109 serves to interface an external low voltage source to the disclosed tunable electrostatic fluid flow generator, hence it is an 'interfacing' element.

Figure 22:
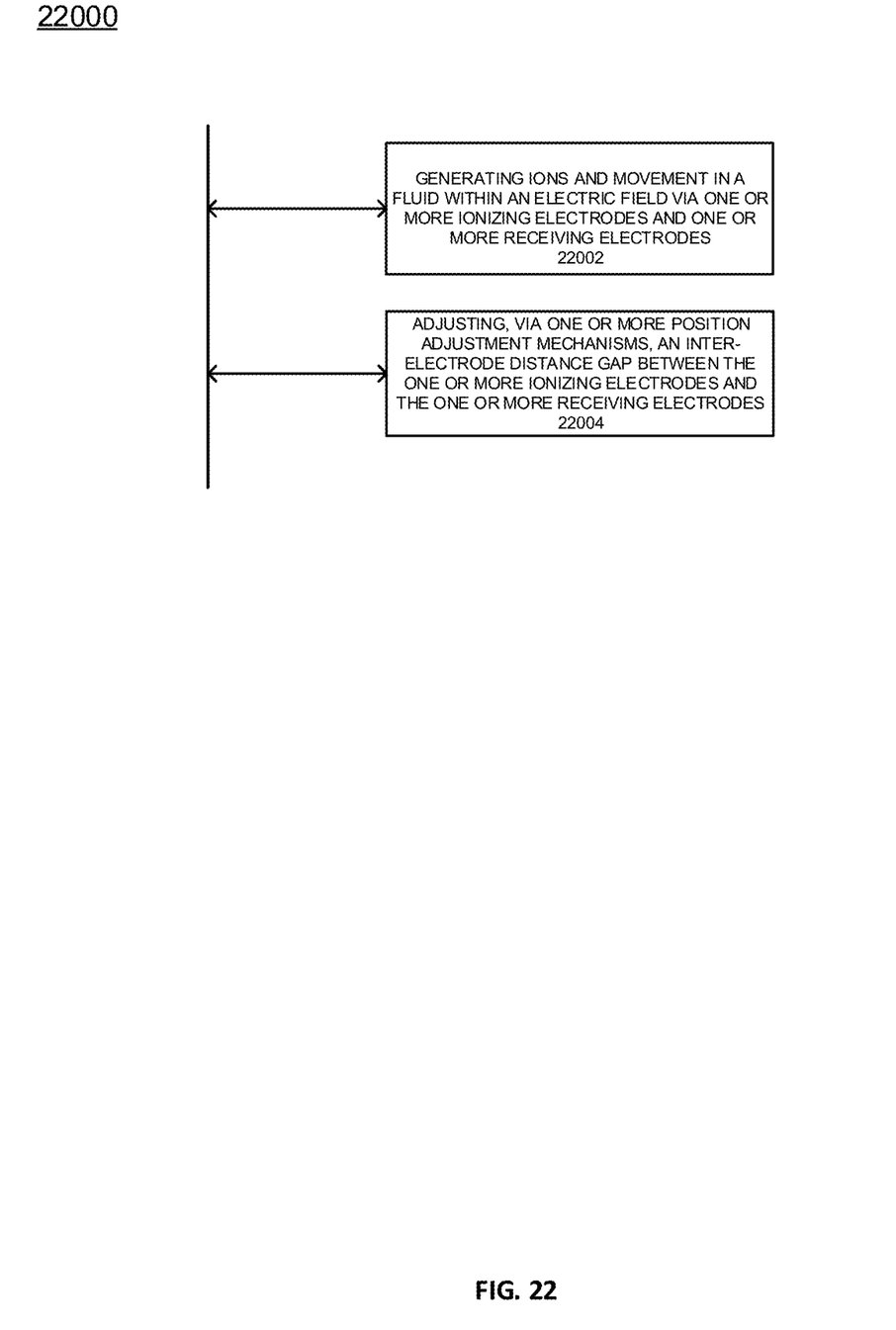
FIG. 22 illustrates an example flow diagram of an example method of operation, according to example embodiments.

FIG. 22 illustrates an example flow diagram of an example method of operation, according to example embodiments. Referring to FIG. 22, the process 22000 may include generating ions and movement in a fluid within an electric field via one or more ionizing electrodes and one or more receiving electrodes 22002, such a generating operation may include a voltage source which engages the electrodes to initiate changes in the fluid. The process may also include adjusting, via one or more position adjustment mechanisms, an inter-electrode distance gap 22004 between the one or more ionizing electrodes and the one or more receiving electrodes. The gap may increase or decrease in distance depending on which direction the bolt(s) or other movement mechanisms are turned. The one or more ionizing electrodes and the one or more receiving electrodes generate one or more of an ion current, fluid flow, acoustic waves and cooling capacity in the fluid, and the inter-electrode distance gap is adjusted to maximize one or more of an ion current, fluid flow, acoustic pressure level of the acoustic waves, and cooling capacity in the fluid. The process may also include adjusting a space, via one or more additional position adjustment mechanisms, between a first pair of the one or more ionizing electrodes and the one or more receiving electrodes and at least one additional pair of the one or more ionizing electrodes and the one or more receiving electrodes positioned coaxially to the first pair. In one example, the one or more position adjustment mechanisms adjust the position of the one or more ionizing electrodes while the one or more receiving electrodes remain stationary. The one or more additional position adjustment mechanisms simultaneously adjusts a position of both the one or more ionizing electrodes and the one or more receiving electrodes of a pair with respect to an adjacent pair. In this example, both electrodes of a pair may be fixed with respect to one another on a moving platform controlled by a motor or rack and pinion type of configuration.

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the devices or systems of the various figures can be performed by one or more of the elements or components described herein or in a distributed architecture. For example, all or part of the functionality performed by the individual elements, may be performed by one or more of these elements.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described here are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
   one or more ionizing electrodes;
   one or more receiving electrodes, wherein the one or more ionizing electrodes and the one or more receiving electrodes are exposed to a fluid to generate ions and movement in the fluid within an electric field; and
   one or more position adjustment mechanisms to adjust an inter-electrode distance gap between the one or more ionizing electrodes and the one or more receiving electrodes.

2. The apparatus of claim 1, wherein the one or more ionizing electrodes and the one or more receiving electrodes generate one or more of an ion current, fluid flow, acoustic waves and cooling capacity in the fluid, and wherein the inter-electrode distance gap is adjusted to maximize one or more of an ion current, fluid flow, acoustic pressure level of the acoustic waves, and cooling capacity in the fluid.

3. The apparatus of claim 1, further comprising
   one or more additional position adjustment mechanisms to adjust a space between a first pair of the one or more ionizing electrodes and the one or more receiving electrodes and at least one additional pair of the one or more ionizing electrodes and the one or more receiving electrodes positioned coaxially to the first pair.

4. The apparatus of claim 1, wherein the one or more position adjustment mechanisms adjust the position of the one or more ionizing electrodes while the one or more receiving electrodes remain stationary.

5. The apparatus of claim 3, wherein the one or more additional position adjustment mechanisms simultaneously adjusts a position of both the one or more ionizing electrodes and the one or more receiving electrodes of a pair with respect to an adjacent pair.

6. The apparatus of claim 1, further comprising
   one or more current controlling elements connected to the one or more ionizing electrodes to control a current flow to the one or more ionizing electrodes.

7. The apparatus of claim 1, further comprising
   one or more current controlling elements connected to the one or more receiving electrodes to control a current flow to the one or more receiving electrodes.

8. The apparatus of claim 1, further comprising:
   one or more current controlling elements connected to the one or more ionizing electrodes to control a current flow to the one or more ionizing electrodes; and
   one or more current controlling elements connected to the one or more receiving electrodes to control a current flow to the one or more receiving electrodes.

9. An apparatus comprising:
   two or more pairs of one or more ionizing electrodes and one or more receiving electrodes exposed to a fluid to generate ions and movement in the fluid within an electric field; and
   one or more position adjustment mechanisms to adjust spaces between a first pair of the one or more ionizing electrodes and the one or more receiving electrodes and at least one additional pair of the one or more ionizing electrodes and the one or more receiving electrodes,
   wherein the two or more pairs of one or more ionizing electrodes and one or more receiving electrodes are arranged coaxially.

10. The apparatus of claim 9, further comprising
    one or more additional position adjustment mechanisms to adjust inter-electrode distance gaps within the pairs of the one or more ionizing electrodes and the one or more receiving electrodes.

11. The apparatus of claim 9, further comprising
one or more current controlling elements connected to the one or more ionizing electrodes to control a current flow to the one or more ionizing electrodes.

12. The apparatus of claim 9, further comprising
one or more current controlling elements connected to the one or more receiving electrodes to control a current flow to the one or more receiving electrodes.

13. The apparatus of claim 9, wherein the one or more position adjustment mechanisms comprise respective rack and pinions affixed to one or more of the two or more pairs of the one or more ionizing electrodes and the one or more receiving electrodes.

14. The apparatus of claim 10, wherein the one or more additional position adjustment mechanisms comprise respective bolt and nuts affixed to the one or more ionizing electrodes.

15. The apparatus of claim 9, further comprising
one or more current controlling elements connected to the one or more ionizing electrodes to control a current flow to the one or more ionizing electrodes; and
one or more current controlling elements connected to the one or more receiving electrodes to control a current flow to the one or more receiving electrodes.

16. A method comprising:
generating ions and movement in a fluid within an electric field via one or more ionizing electrodes and one or more receiving electrodes; and
adjusting, via one or more position adjustment mechanisms, an inter-electrode distance gap between the one or more ionizing electrodes and the one or more receiving electrodes.

17. The method of claim 16, wherein the one or more ionizing electrodes and the one or more receiving electrodes generate one or more of an ion current, fluid flow, acoustic waves and cooling capacity in the fluid, and wherein the inter-electrode distance gap is adjusted to maximize one or more of an ion current, fluid flow, acoustic pressure level of the acoustic waves, and cooling capacity in the fluid.

18. The method of claim 16, further comprising
adjusting a space, via one or more additional position adjustment mechanisms, between a first pair of the one or more ionizing electrodes and the one or more receiving electrodes and at least one additional pair of the one or more ionizing electrodes and the one or more receiving electrodes positioned coaxially to the first pair.

19. The method of claim 16, wherein the one or more position adjustment mechanisms adjust the position of the one or more ionizing electrodes while the one or more receiving electrodes remain stationary.

20. The method of claim 18, wherein the one or more additional position adjustment mechanisms simultaneously adjusts a position of both the one or more ionizing electrodes and the one or more receiving electrodes of a pair with respect to an adjacent pair.

* * * * *